United States Patent
Bink et al.

(10) Patent No.: US 7,484,078 B2
(45) Date of Patent: Jan. 27, 2009

(54) PIPELINED ASYNCHRONOUS INSTRUCTION PROCESSOR HAVING TWO WRITE PIPELINE STAGES WITH CONTROL OF WRITE ORDERING FROM STAGES TO MAINTAIN SEQUENTIAL PROGRAM ORDERING

(75) Inventors: Adrianus Josephus Bink, Eindhoven (NL); Mark Nadim Olivier De Clercq, Eindhoven (NL)

(73) Assignee: NXP B.V., Eindhoven (NL)

( * ) Notice: Subject to any disclaimer, the term of this patent is extended or adjusted under 35 U.S.C. 154(b) by 232 days.

(21) Appl. No.: 11/568,197

(22) PCT Filed: Apr. 21, 2005

(86) PCT No.: PCT/IB2005/051312

§ 371 (c)(1),
(2), (4) Date: Oct. 20, 2006

(87) PCT Pub. No.: WO2005/103885

PCT Pub. Date: Nov. 3, 2005

(65) Prior Publication Data

US 2008/0040581 A1    Feb. 14, 2008

(30) Foreign Application Priority Data

Apr. 27, 2004    (EP) .................................. 04101748

(51) Int. Cl.
*G06F 9/30* (2006.01)
(52) U.S. Cl. .................................................... 712/218
(58) Field of Classification Search .................. 712/218; 703/16–17
See application file for complete search history.

(56) References Cited

U.S. PATENT DOCUMENTS 4,680,701 A * 7/1987 Cochran ...................... 712/40
5,530,815 A * 6/1996 Nabekura et al. ........... 712/227

(Continued)

OTHER PUBLICATIONS

Furber S B et al: "Amulet3: A 100 MIPS Asynchronous Embedded Processor"; Computer Design, 2000 Proceedings 2000 International Conference on Austin TX USA Sep. 17-20. IEEE Comput Soc. US pp. 329-334.

*Primary Examiner*—Richard Ellis

(57) ABSTRACT

A data processing circuit contains a register file (17) with a write port and a pipeline of instruction processing stages (10a-d). A timing circuit (14) is arranged to time transfer of instruction dependent information between the stages at mutually different time points, so that processing of successive instructions in respective stages partially overlaps. A first and a second one of the stages (10c,d) are in series in the pipeline. Each of the first and a second one of the stages has a result output for writing a result to the write port, if instruction dependent information in the stage concerned (10c,d) requires writing. A write sequencing circuit (144) performs write tests alternately for instruction dependent information in the first and second one of the stages (10c,d). When the write sequencing circuit (144) performs the write test for a particular one of the stages (10c,d), it tests whether the instruction dependent information in the particular one of the stages (10c,d) requires writing of a result. If so, the write sequencing circuit (144), delays transfer of new instruction dependent information through the pipeline (10a-d) to the particular one of the stages (10c,d) until the write port has been committed to writing the result before any results that the write port is subsequently committed to write.

11 Claims, 4 Drawing Sheets

Figure 1:
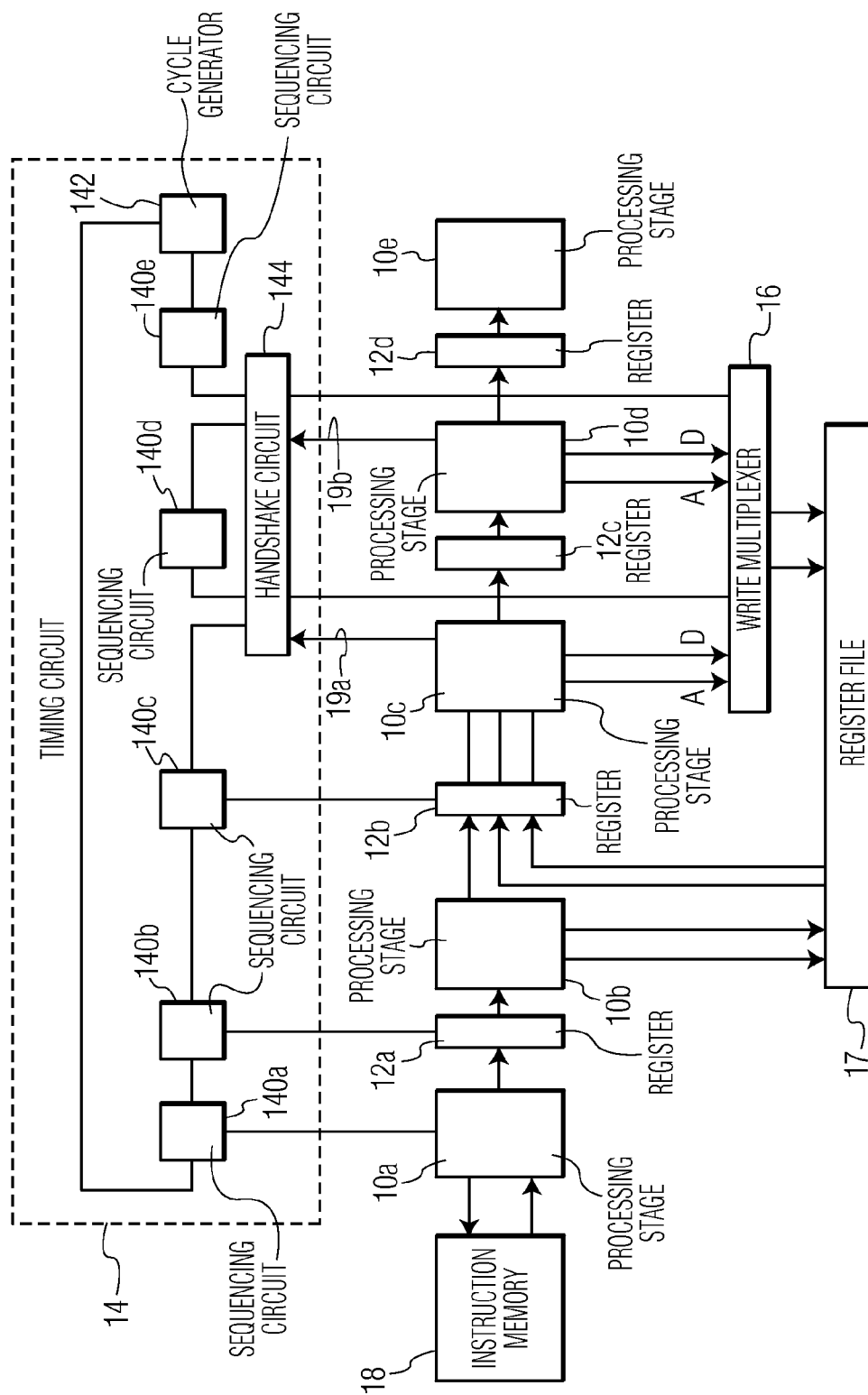

U.S. PATENT DOCUMENTS 5,553,276 A * 9/1996 Dean .......................... 713/500
6,301,655 B1 * 10/2001 Manohar et al. ............ 712/244

2002/0156995 A1 10/2002 Martin et al.

* cited by examiner

PIPELINED ASYNCHRONOUS INSTRUCTION PROCESSOR HAVING TWO WRITE PIPELINE STAGES WITH CONTROL OF WRITE ORDERING FROM STAGES TO MAINTAIN SEQUENTIAL PROGRAM ORDERING

The invention relates to a data processing circuit with a pipelined asynchronous instruction processor.

Instruction execution pipelining is a conventional technique in computers, which involves using an instruction processor that contains a plurality of stages for performing respective steps of instruction processing. Typical steps include an instruction fetching step, an instruction decoding/operand fetching step, an execution (computation) step and a result write back step. The stages operate in parallel according to an assembly line principle, so that an earlier stage perform one step for a first instruction while a subsequent stage performs a follow-on step for an earlier instruction, using partial results that the earlier stage has produced for the earlier instruction. The majority of present day instruction processors is implemented with synchronous circuits, that is, circuits wherein all stages operate under control of the same central clock, all instructions moving one stage downstream together at the end of a clock cycle.

US patent application No. 2002/0156995 discloses a pipelined asynchronous instruction processor. In this processor no central clock is used. Instead, neighboring stages synchronize with each other only when a first stage has to update information that is supplied to a next stage. In the analogy of the assembly line: instead of using one conveyor belt that moves instructions to the next stage from all stages at the same time, each stage selects its own time when the stage has finished with an instruction and the next stage is free to receive the instruction. Typically, handshake signals are exchanged to indicate that the first stage has information available and the next stage is ready for receiving new information.

In addition to using asynchronous stages in series a US patent application No. 2002/0156995 also uses a number of different execution stages in parallel, as alternatives for the same pipeline stage, which makes it possible to commence execution of the execution step for an instruction even if the execution step of an earlier instruction has not yet been completed.

However, a program of instructions typically assumes that the results of the instructions are written to a register file in the order of appearance of the instructions. This is conventionally ensured by providing a write back stage in the pipeline, through which the instructions pass sequentially and which writes the results to the register file. US patent application No. 2002/0156995 applies this technique to an asynchronous pipeline. Although the actual results may be supplied to the register file from different stages possibly out of order, the write back stage determines the order in which the results are written to the register file. For this purpose the write back stage uses a queue circuit that receives and outputs the instructions in succession. The write back stage reads the instructions from the queue and, upon reading an instruction, causes its result to be written to the register file before proceeding to the next instruction.

A similar technique is described in an article titled "Amulet3: a 100 MIPS Asynchronous Embedded Processor", by S. B. Furber, D. A. Edwards and J. D. Garside, and published in 2000 IEEE International Conference on Computer Design: VLSI in Computers & Processors (ICCD'00) Sep. 17-20, 2000. This article considers a processor that executes a program with two types of instructions: memory access instructions and processor-internal instructions that do not require access to memory. At some stage of the pipeline the memory access instructions are executed in parallel with the "internal" instructions. As a result, the results of load instructions may be produced out of order with respect to the results of internal instructions. This article also provides for ordered write back. The write back function is performed using a reorder buffer. An instruction decoder assigns each instruction its own location in the reorder buffer. Once a result is produced it is written to the location assigned to its instruction. A process waits for each result in turn, in the order of the instructions and copies back the result to the register file.

Although these processors thus ensure that results are written to the register file in proper order, they do so at the expense of considerable overhead: a write back stage needs to be provided that keeps track of all instructions and the availability of their results.

Among others, it is an object of the invention to provide for a circuit with a pipelined asynchronous instruction processor in which a predetermined order of writing results to a register file is ensured without requiring use of a reorder buffer.

The circuit according to the invention is set forth in claim 1. In this circuit at least two successive stages of the pipeline are equipped to write results to a register file through the same write port. A write sequencing circuit ensures these successive stages of the pipeline each get the opportunity to write a result, if an instruction in the stage requires this.

The write sequencing circuit ensures that the opportunities are given in a predetermined, indefinitely repeated sequence, so that each stage that has the ability to write a result gets the opportunity to write in response to its current instruction in turn in each sequence, before another stage gets a next opportunity to write in response to a next instruction in the next sequence. This ensures that the sequence of writing corresponds to the sequence of instructions in the program. Timing freedom of the asynchronous stages does not lead to unpredictable write sequences. If the instruction in a stage requires the stage to write, the write sequencing circuit prevents transfer of a new instruction to the stage until the write port has been committed to writing the result, so that the result is will be written before results that the writing circuit commits to later. (Committing, as used herein, may include actual writing to the register file, or loading the result into a pipeline through which results are written to the register file in sequence of loading or any other mechanism that is guaranteed to write results in the sequence in which the different results are committed to). This operates more or less as an escapement mechanism in a clock, preventing progress through the pipeline at one writing stage until another writing stage has advanced and vice versa The write sequencing circuit can be combined with various different asynchronous timing circuits for timing transfer of instruction information through the pipeline. In one embodiment a backward sequencing circuit is used, wherein waves of transfers occur, each wave involving transfers to stages that are successively more upstream along the pipeline, each wave being triggered by arrival of the previous wave at the start of the pipeline, or a pipeline section. In this embodiment the write sequencing circuit can be incorporated as part of the timing circuit for timing transfer of instruction information through the pipeline, by delaying the propagation in a wave conditionally if an instruction in a stage requires writing and the write port is not ready to accept a result.

In another embodiment, the timing circuit comprises handshake—interfaces between successive stages, to start a transfer when the downstream stage is ready for the next instruction and the upstream stage has the instruction available. In this embodiment and the previous a separate write sequencing circuit, operating as an escapement in a clock may be used.

In a further embodiment the timing of the opportunity for a particular stage to write is linked to the timing of transfer of instruction information out of that particular stage to the next stage in the pipeline. Transfer of new instruction information into the particular stage is held up until both the instruction information has been transferred to the next stage and writing of the result has been initiated.

In another embodiment some instructions may require writing multiple results from the same stage. In this case the write sequencing circuit preferably ensures that writing of all results has at least been initiated before the opportunity is given to the next stage in the sequence.

In an embodiment the number of results that are written from each stage depends on the type of instruction executed by the stage. Some instructions may require one stage to write a result, while other instruction may require another stage to write. For example, an arithmetic stage may write in response to arithmetic instructions and a memory stage may write in response to memory load instructions. Yet other instructions may require more than one stage to write, at the different times when the instruction is in these stages respectively. For example, load instruction with address register incrementation in the arithmetic stage may involve a write of the incremented address value to the register file from the arithmetic stage and a write of a load result from the memory stage. Yet other instructions may require writing a plurality of results from a stage. For example, a complex arithmetic operation may require writing of a real part and an imaginary part of a result to different registers in the register file.

In an embodiment, exactly two successive stages that are capable of writing to the register file are used, so that each gets the opportunity to write in turn. But the invention is not limited to two writing stages, or to immediately adjacent stages.

These and other objects and advantageous aspects of the invention will be described by means of non-limiting examples, using the following figures.

Figure 2:
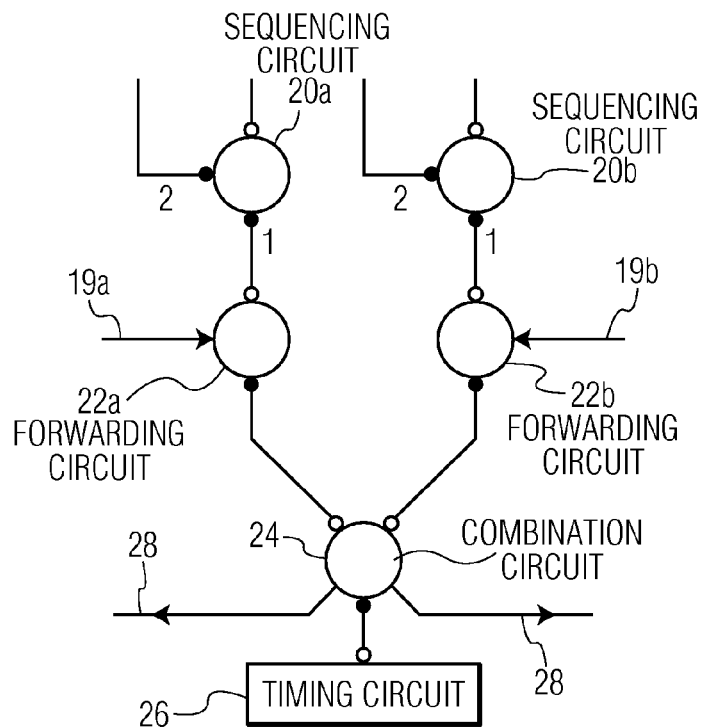
Figure 4:
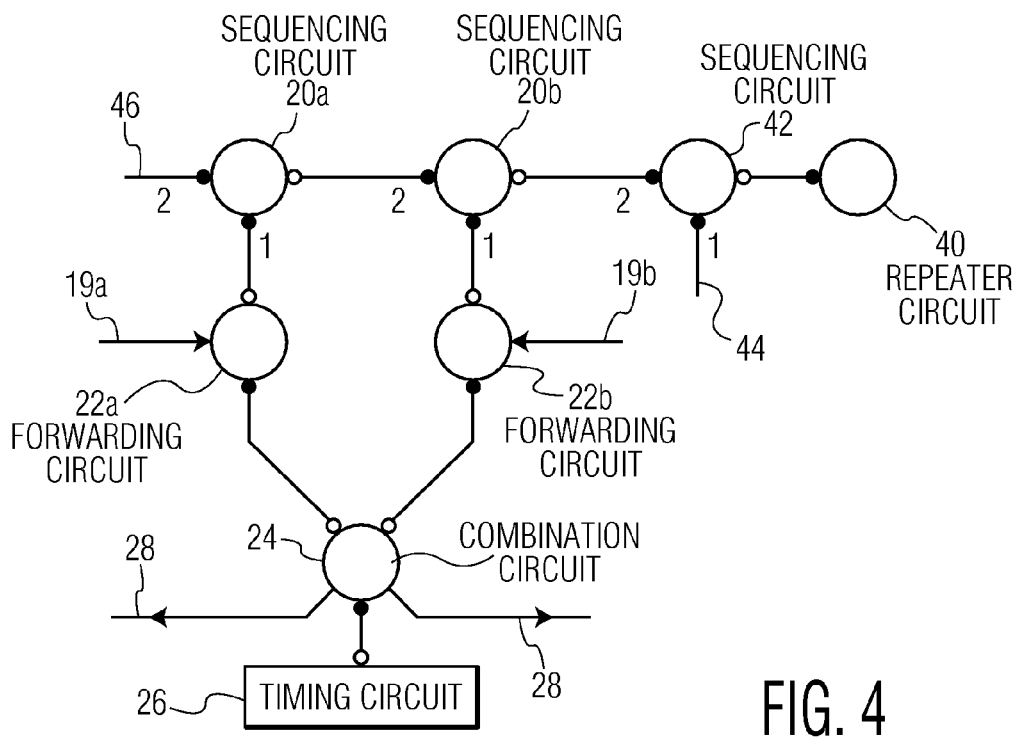
Figure 3:
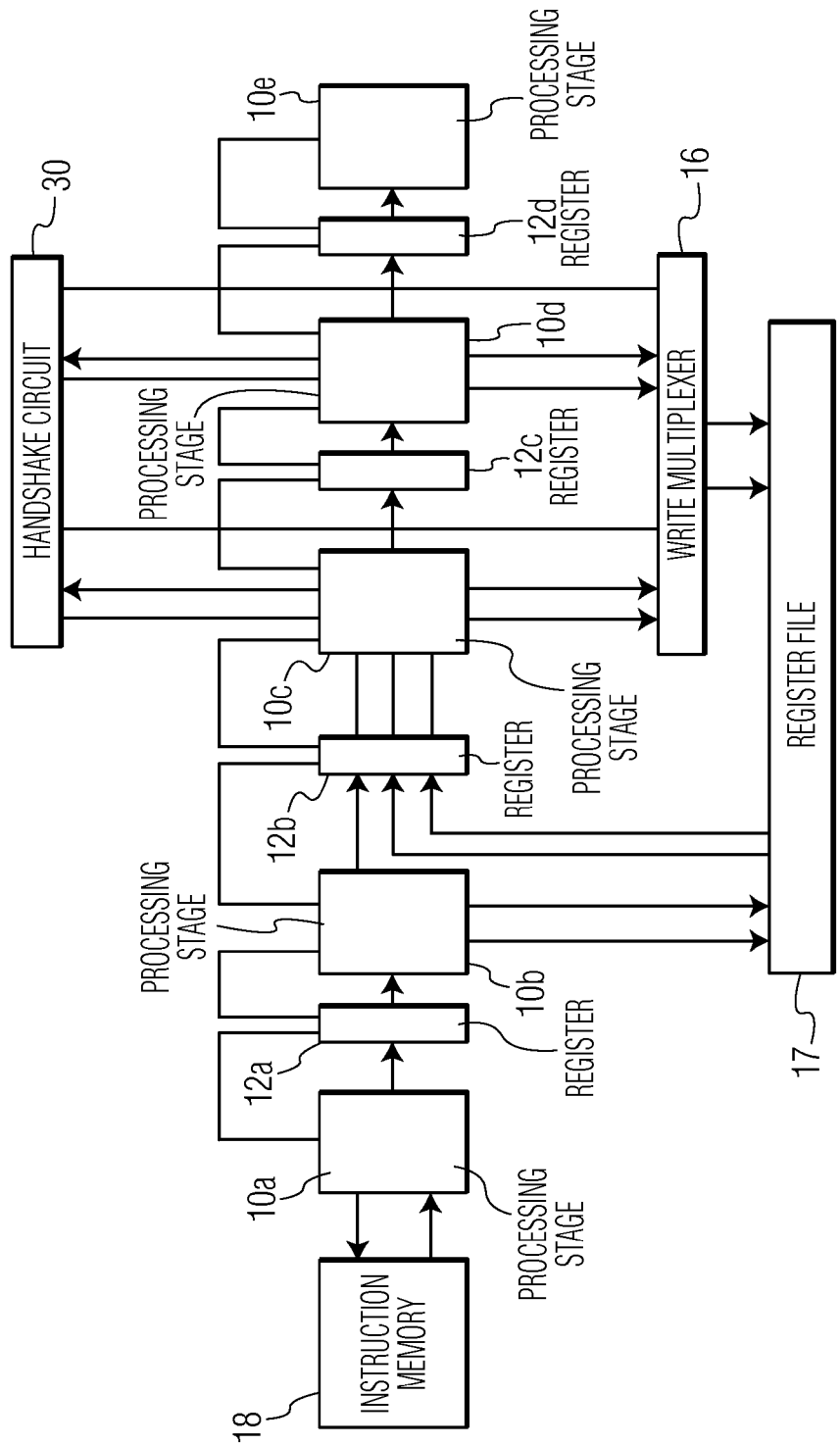
Figure 5:
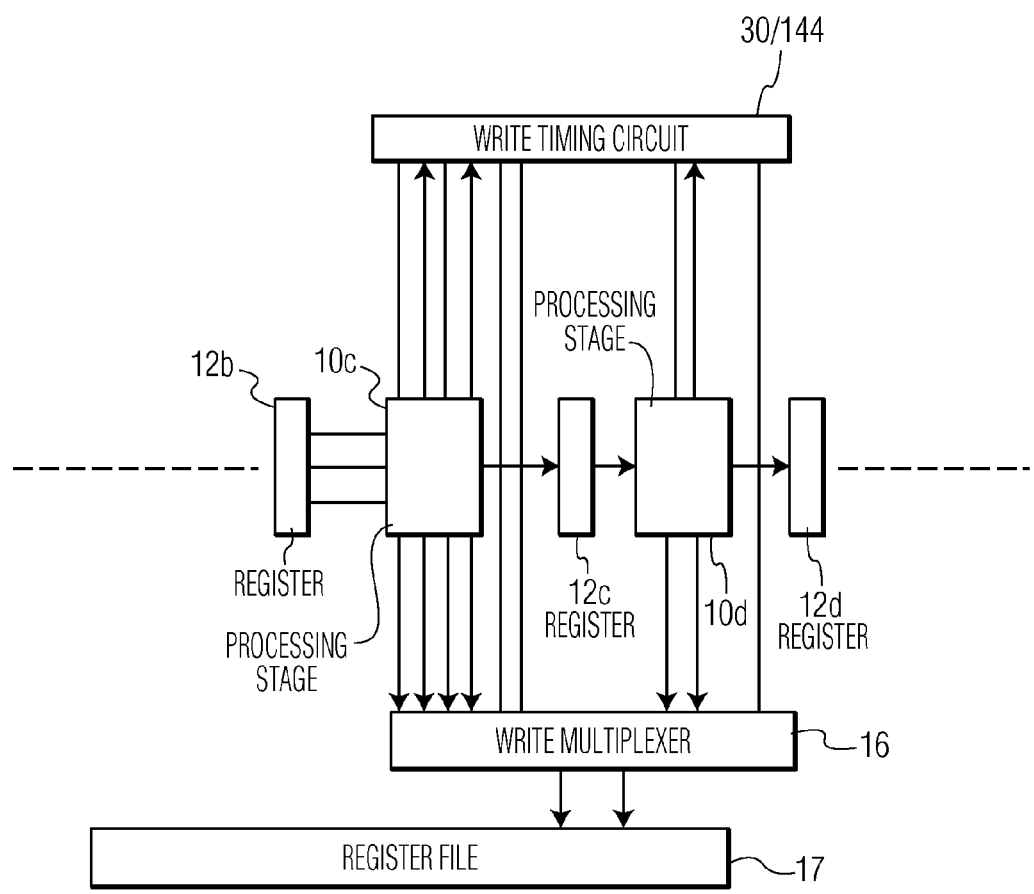

FIG. 1 shows a pipelined instruction processing circuit
FIG. 2 shows a write timing circuit
FIG. 3 shows an alternative a pipelined instruction processing circuit
FIG. 4 shows an alternative write timing circuit
FIG. 5 shows part of a pipelined instruction processing circuit FIG. 1 shows an instruction processing circuit, with a number of processing stages 10a-e, registers 12a-d, a timing circuit 14, a write multiplexer 16, a register file 17 and an instruction memory 18. Processing stages 10a-d are connected in a pipeline via registers 12a-d. Each stage 10b-e, except the first stage 10a has one or more instruction information inputs coupled to a preceding pipeline register 12a-d, and each stage 10a-d except the last stage 10e has an instruction information output coupled to a following pipeline register 12a-d. Two processing stages 10c,d have additional result outputs, for outputting a result and an accompanying register address to multiplexer 16. These processing stages 10c,d also have validation outputs 19a,b coupled to timing circuit 14. The validation output of a stage serving to indicate whether writing from the stage to register file is required.

The processing stages are for example an instruction fetching stage 10a, a decoder/operand fetching stage 10b, an execution stage 10c, a memory access stage 10d and a final stage 10e. Instruction fetching stage 10a has an instruction address output and an instruction input coupled to instruction memory 18. Instruction memory 18 may be a simple memory, or a more complicated memory system containing a cache etc. Operand fetching stage 10b has register address outputs coupled to read ports of register file 17. Register file 17 has read data outputs coupled to pipeline register 12b that precedes execution stage 10c. The result outputs of execution stage 10c and memory stage 10d are coupled to multiplexer 16, which has data/address outputs coupled to a write port of register file 17.

In the embodiment of the figure timing circuit 14 contains a cycle generator 142, sequencing circuits 140a-e and write handshake circuit 144 and has outputs coupled to registers 12a-d, to instruction fetch stage 10a and to write multiplexer 16. The output to the instruction fetch stage controls update of the program counter. The outputs to multiplexer 16 control writing to register file 17. The outputs to registers 12a-d control timing of copying of information between successive stages 10a-e. Effectively, each sequencing circuit 140a-e corresponds to a respective stage 10b-e that has its input coupled to the register 12a-d to which the sequencing circuit 140b-e is coupled. Cycle generator 142 and sequencing circuits 140a-e are connected in a loop, wherein the connection between the sequencing circuit 140e for the final stage 10e and the sequencing circuit 140d for the memory stage 10d are connected via write handshake circuit 144. Similarly the connection in the loop between the connection between the sequencing circuit 140d for the memory stage 10d and the sequencing circuit 140c for the execution stage 10c are connected via write handshake circuit 144. Write handshake circuit 144 is also coupled to validation outputs 19a,b from execution stage 10c and memory stage 10d.

In operation, fetch stage 10a fetches successive instructions and applies these instructions to the register 12a of decoder stage 10b. Decoder stage 10b read each instruction from its register 12a and generates decoded information from the instruction. Decoder stage 10b also extracts operand register addresses from the instruction and applies them to register file 17. In response register file 17 produces the content of the addressed registers. Register 12b of execution stage 10c stores the decoded information and the content of the addressed registers.

Execution stage 10c executes an operation according to the decoded information and feeds instruction information to the register 12c of memory stage 10d. The instruction information may include a copy of instruction information from decoder stage 10b execution stage, but it may also contain information generated by execution stage, such as a memory address for use by memory stage 10d. For a first and second type of instruction (e.g. add instructions, or memory access instructions wherein an index register is updated) execution stage 10c produces a result, which it feeds to multiplexer 16, together with a register address from the instruction information. In response to this type of instruction execution stage 10c generates a validation signal at validation output 19a. A third and fourth type of instruction (e.g. memory access instructions wherein no index update occurs) does not result in a valid result and register address. In response to this type of instruction execution stage 10c generates no validation signal at validation output 19a.

Memory stage 10d subsequently receives the instruction information produced by execution stage 10c and accesses data memory, if this is required by the instruction information. For the first and third type of instruction (e.g. memory read instructions) memory stage 10d produces a result, which it feeds to multiplexer 16, together with a register address from the instruction information. In response to this type of instruction memory stage 10d generates a validation signal at validation output 19b. The second and fourth type of instruction (e.g. add instructions) does not result in a valid result and register address from memory stage 10*d*. In response to this type of instruction memory stage 10*d* generates no validation signal at validation output 19*b*.

Timing circuit 14 controls timing of processing, and in particular the time points at which registers 12*a-d* take over information between the stages 10*a-d*. In one embodiment, a backward sequencing mechanism is used, wherein registers 12*a-d* each capture data after the next register 12*a-d* downstream has captured information. Thus, registers 12*a-d* that are successively more upstream (closer to initial stage 10*a*) capture information successively. In this embodiment cycle generator 142 starts a next cycle starting from the register 12*d* furthest downstream followed by updating of successively more upstream registers 12*a-c*, once the program counter has been updated, starting the fetch of a next instruction.

In addition, timing circuit 14 starts write operations to register file 17 if execution stage 10*c* or memory stage 10*d* indicate that a current instruction requires this. The time points of these write operations are linked to the time points at which timing circuit causes registers 12*a-e* to capture data. When timing circuit 14 causes a register 12*c,d* to capture data from a stage 10*c,d*, it also causes register file to start a write operation with an address and a result from that stage, provided that the stage 10*c,d* indicates that the instruction in that stage 10*c,d* requires writing and register file 17 is ready to accept a new write (is sufficiently far advanced with a previous write). Subsequently timing circuit 14 signals the next register 12*a-e* upstream to capture data.

If the instruction does not require writing, timing circuit 14 immediately signals the next register upstream to capture data. If writing is required but register file 17 is not ready, timing circuit 14 waits until register file 17 is ready to accept the write, when that occurs timing circuit causes register file 17 to start the write and subsequently timing circuit 14 signals the next register 12*a-e* upstream to capture data.

Various embodiments of register file 17 are possible to support writing of results into register file 17. In a simplest embodiment results are written directly from multiplexer 16 into register file 17. But in more advance embodiments one or more registers may be provided for buffering results, or even a FIFO buffer. In such embodiments register file 17 can be said to be ready for a next result when buffer space is available to store the result for later writing, even though writing of earlier results is still in progress. In further embodiments register file 17 may include a bypass mechanism, which compares read addresses at the read ports of register file 17 with write addresses of as yet uncompleted write actions and replaces the read results on the read ports with the results from the latest such uncompleted write action.

In terms of pseudo code the circuit can be described as follows. The overall operation of the pipeline is described as follows

```
forever do
    stage_n( ); stage_n-1( ); stage_n-2( ); stage_1( )
od
```

Here ";" separates sequentially executed activities. The activity of the $i^{th}$ stage (i=1 ... n) denoted by "stage_i", includes at least capture of produced data ("data1_i") of the $i^{th}$ stage into a stage register at the end of the stage and in front of the next stage:

stage_register_i:=data1_i (It may be noted that this type of pseudo code can be translated automatically into timing circuits, using the Tangram language, which is known per se). For two successive stages the stage activity also includes writing data to the register file:

```
stage_register_i:=data1_i ||
    if(vld_i) rf_activate ! <<data2_i, dst_i>>
```

Here || denotes parallel (not necessarily sequential) activities and "!" denotes writing of the information to the right of the "!" to the channel identified to the left of the "!". That is, writing data2_i from a stage and a register address dst_i from that stage if the validation signal vld_i of the stage indicates that the instruction processed by the stage requires writing to the register file. "rf_activate" denotes a shared channel coupled to the register file, to which both stages are able to write. The activity of the register file may be represented by the following pseudo code:

```
forever do
    rf_activate? <<data, dst>>;
    rf_write(data,dst);
od
```

That is the register file "listens" to the rf_activate channel and writes data into the register file at an addressed register if data is received, before listening for new data. In a further embodiment, the register file also communicates with a write back stage for controlling bypass.

FIG. 2 schematically shows an implementation of write timing circuit 144. This implementation contains two branches, each with a sequencing circuit 20*a,b*, and a conditional handshake forwarding circuit 22*a,b*. Furthermore the implementation contains a handshake combination circuit 24 and a register file timing circuit 26. The sequencing circuits 20*a,b* in each branch have a passive terminal coupled to a corresponding sequencing circuit 140*d,e* (not shown) of the timing circuit, a sequentially first active terminal coupled to the forwarding circuit 22*a,b* of the branch and a sequentially second active terminal coupled to one of the sequencing circuits 140*c,d* (not shown) of the timing circuit that is upstream of the corresponding sequencing circuit of the branch. That is, the sequentially second terminal of the sequencing circuit 20*b* of the second branch is coupled to the passive terminal of the sequencing circuit 20*a* of the first branch, possibly via other circuits that control timing of the stage. In turn, the sequentially second terminal of the sequencing circuit 20*a* of the first branch in turn is coupled to the passive terminal of the sequencing circuit 20*b* of the second branch, via other circuits that control timing of the stages. Forwarding circuits 22*a,b* have condition inputs coupled to validation outputs 19*a,b*. Forwarding circuits 22*a,b* have active terminals coupled to combination circuit 24, which in turn has an active terminal coupled to register file timing circuit 26 and selection outputs 28 coupled to multiplexer 16 (not shown) to control from which of the multiplexer inputs data will be passed. Each sequencing circuits 20*a,b* is arranged to respond to a request signal at its passive terminal by first generating a request at its sequentially first active terminal, waiting for acknowledgement of that request and subsequently generating a request at the sequentially second active terminal. The implementation of sequencing circuits 20a,b depends on the type of handshake used, but in a simple implementation a request signal conductor of the passive terminal is coupled to the request signal conductor of the sequentially first active terminal and the acknowledge signal conductor of the sequentially first active terminal is coupled to the request signal conductor of the sequentially second active terminal.

Each forwarding circuit 22a,b is arranged to either acknowledge requests from its passive terminal immediately if no validation signal is present at validation output 19a,b, or to forward a request to combination circuit 24 and return an acknowledgement from that circuit is a validation signal is present. The implementation of forwarding circuit 22a,b depends on the type of handshake used, but in a simple embodiment a multiplexing circuit is used, which is controlled by the validation signal and couples incoming requests either back to an acknowledge signal conductor of the sequentially first active port of sequencing circuit 20a,b or to combination circuit 24. More general examples of implementations of handshake circuits can be found per se in a thesis by A. Peters, titled "Single Rail Handshake circuits" ISBN 90-74445-28-4

Combination circuit 24 is arranged to forward requests from forwarding circuits 22a,b to register file timing circuit 26 if no request is pending at its active terminal to register file timing circuit 26. When it forwards the request combination circuit 24 acknowledges the request of the relevant forwarding circuit 22a,b and signals to multiplexer 16 (not shown) for which stage 10c,d it has received a request. Typically this signal also serves to enable writing to register file 17. If a request to register file timing circuit 26 is pending combination circuit 24 waits until the pending request is acknowledged, before forwarding the new request from a forwarding circuit 22a,b and acknowledging that request.

The implementation of combination circuit 24 depends on the type of handshake used, but in a simple embodiment a pair of flip-flops is used each for a respective one of forwarding circuits 22a,b. Each flip-flop is set by requests from its forwarding circuit 22a,b and reset by acknowledgements from register file timing circuit 26. A set output signal of a flip-flop disables setting of the other flip-flop, causes an acknowledge signal to the relevant forwarding circuit 22a,b, causes a request signal to register file timing circuit 26 and indicates to multiplexer 16 which stage 10c,d must be coupled to register file 17. Register file timing circuit 26 acknowledges a request when register file 17 has had time to write the result from the relevant stage. The implementation of combination register file timing circuit 26 depends on the type of handshake used, but in a simple embodiment a delay circuit may be used, which acknowledges requests after a delay sufficient to write a result to register file 17.

It should be emphasized that suitable asynchronous timing circuits with different kinds for generating and accepting handshakes are known from the art. The implementations that have been discussed merely serve as simple examples. Therefore the invention is not limited to these implementations.

It should be realized that the invention is not limited to the embodiment shown in FIG. 1. For example, instead of the particular backward sequencing circuit any other type of pipeline timing circuit may be used. Also, instead of linking register file write operations to transfer of information to pipeline registers 12a-d a sequencing circuit may be used to ensure the stage 10c,d that may produce a result alternately get the opportunity to write the result. This will be discussed in more detail.

In the example, the backward sequencing circuit provides an advantageously simple mechanism of exploiting parallelism in the pipeline. No complicated handshaking is needed because the start of a new series of pipeline register capture actions starts after arrival of the previous series at the start of the pipeline. Thus, the delay that is needed to propagate backward through the pipeline is used to give each stage time to process its current instruction. In essence, in this case, sequencing circuits 140a-d need to be no more than delay circuits that ensure sufficient time to capture data in a pipeline register 12a-d before starting capture in the next pipeline register upstream.

In the case of very long pipelines, the loop of sequencing circuits 140a-e may be split into a plurality of sub-loops, in each of which a new series timing signals is triggered at the downstream end of the sub-loop by arrival of a previous timing signal at the upstream end of the sub-loop if a timing signal from the next sub-loop downstream (if any) has arrived. In the case of short loops, there may be a risk that a new timing signal arrives before a stage has completed its operation. In this case, additional circuits may be provided to delay transfer of a timing signal from one sequencing circuit 140a-d to the next one upstream until the underlying stage 10a-d has indicated that it has processed the previous instruction.

As an alternative, a full blown asynchronous pipeline may be used, that is, a pipeline wherein the generation of a timing signal from the end of the pipeline does not wait for the arrival of a previous timing signal at the upstream end of a loop. In this case, a forward timing mechanism may be used for example in which the timing circuit 14 is arranged to generate a request for the end of a stage 10a-d when the stage is ready and the timing circuit acknowledges the request when the next stage 10a-d no longer needs its current information and has copied the information from the requesting stage.

In this type of alternative the invention may be implemented in the same way as in FIG. 1 by a write timing circuit that links the opportunity to write a result from a stage 10a-d (whether the opportunity is used depending on the generation of a validation signal) to writing to a pipeline register 12a-d downstream from the stage 10a-d. The opportunity to request a write is given only when capture of information into the pipeline register 12a-d at the input of the next stage 10a-d downstream is allowed. At this time it is ensured that this next stage has had the opportunity to write a result to register file 17. An acknowledgment to the next stage 10a-d upstream is permitted only when both the information has been captured in the pipeline register 12a-d and the opportunity to write has been given. The sequence in which this happens is not relevant: the information may be captured in the pipeline register 12a-d first or the opportunity to write the result may be given first, or both may be performed in parallel.

FIG. 3 shows an embodiment wherein an independent write timing handshake circuit 30 is used. In this embodiment, stages 10a-b have handshake connections to synchronize with each other when needed (for the sake of clarity these connections are shown to connect to pipeline registers 12a-d, which are assumed to contain handshake handling circuitry for this purpose). In addition stages 10c,d are arranged to exchange handshake signals with write timing handshake circuit 30. Each stage 10c,d that may want to write a result generates a validation/no validation signal when it is sufficiently ready, after which it exchanges a handshake with write timing handshake circuit 30. For example, write timing handshake circuit 30 may generate requests alternately to a first stage and a second stage 10c,d and the stages 10c,d may acknowledge these request when ready. Equivalently, stages 10c,d may generate requests, handshake circuit acknowledging these requests alternately.

FIG. 4 shows an embodiment wherein write timing handshake circuit 30 is implemented similarly to that of FIG. 2, with an added repeater circuit 40 and a sequencing circuit 42. Active terminals 44,46 are provided for exchanging handshakes with stages 10c,d. However, it should be realized that many other implementations are possible, using for example requests from stages 10c,d instead of acknowledgements, or using a register file write clock circuit whose clock periods may be stretched etc.

By now it should be appreciated according to the invention a plurality of stages 10c,d in a pipeline are able to write results to a register file 17 via the same write port. Whether a stage writes depends on the instruction processed by the stage. A timing circuit ensures that the stages alternately get the opportunity to start a write. In this way, it is ensured that a predetermined sequence of writes in a program is preserved. For example, suppose a program contains successive instructions

| Load | ++R1, R2 |
| Add | R3, R4, R5 |

(Load: increment value of register R1 and use value as address to fetch data into register R2. Add: add values from registers R3 and R4 and write into R5; R2 and R5 may be the same register, in which case the order of writing should correspond to the order of the instructions). Now the content of R1 will be loaded and execution stage 10c will first increment this value. Execution stage 10c writes the result of incrementation to register R1 in register file 17. Execution stage 10c next passes the instruction and the incremented address to memory stage 10d. Next memory stage 10d fetches data from a memory location with an address according to this result and execution stage 10c adds the content of R3 and R4. Execution stage 10c writes the result of the addition to R5 and memory stage 10d writes the result of the fetch to R2. Timing circuit 14 ensures that the result of the fetch is written first and the result of the addition is written next.

It will be appreciated that the invention is not limited to writing the same result that is written to register file 17 also to memory stage 10d. In the case of a "post-increment" instruction (R1++), for example, the content of register R1 is passed to memory stage 10d and the incremented value is written back to register file 17.

In a similar example no incrementation of R1 is needed for the load instruction:

| Load | R1, R2 |
| Add | R3, R4, R5 |

In this case execution stage 10c also writes the result of the addition to R5 and memory stage 10d writes the result of the fetch to R2. Timing circuit 14 ensures that the result of the fetch is written first and the result of the addition is written next, even though the writes occurred from different stages and therefore had non-uniform latencies.

Of course it may occur that a register read occurs from a register from register file 17 for which there is a pending write. In this case, in one embodiment the old content of a register may be used if a write operation for that register is pending. In a more advance embodiment any bypass mechanism may be used to substitute results of pending write actions in the results of register read actions. In this embodiment, a problem of undetermined reads may in theory arise if a deep pipeline is used and if timing of result write operations is not synchronized to read operations. This problem is prevented by the backward sequencing mechanism of FIG. 1, which prevents a new wave of register captures form the downstream end of the pipeline as long as a previous wave has not yet travelled to the upstream end of the pipeline. In a completely asynchronous pipeline it may be necessary to include the stages that read from register file 17 in the sequencing arrangement of the writing stages 10a,c to avoid this problem. This is done to ensure that each cycle of new captures in a pipeline register 12a-d and write of a result to the register file 17 occurs in the writing stages after a respective capture in the register reading stage. However, usually this type of sequencing is superfluous.

In the examples, each stage 10a-d at most requires writing of one result to a register in response to one instruction. However, without deviating from the invention, in a further embodiment one or more of the stages 10a-d may be arranged to write a plurality of results in response to that same instruction. For example, an execution stage 10c could be arranged to write back both a sum and a difference of two operands to different registers of register file 17.

FIG. 5 shows part of a pipelined processor wherein one of the stages 10c is arranged to write a plurality of results. In this embodiment address/result outputs, validation outputs and handshake terminals are provided for each result. A three input multiplexer 16 is used. Write timing circuit 30/144, which may be similar to that used in FIG. 1 or FIG. 4, ensures that the stages 10c,d get the opportunity to write each result in turn. This may be realized for example by linking writing of the results to writing of information into the pipeline registers 12c,d. Alternatively an independent sequencing mechanism may be used to ensure that the stages get the opportunity to write in sequence, the stage 10c that can write two result getting two opportunities in sequence. Obviously, this can be extended to any number of results.

It will be appreciated that FIG. 5 merely shows one embodiment. In another embodiment for example, the same address/result output may be used for a plurality of results. In this embodiment stage 10c ensures that all results are applied to the one address/result output before acknowledging that it has taken its turn. In another alternative write timing circuit ensures that all results of the plurality are written, for example by issuing more than one request to register file 17 before proceeding when stage 10c indicates that more than one valid result is available.

In a further embodiment register file may have more than one write port, at least one port being shared as described for a single port in the preceding, the other port or ports allowing other results to be written in parallel, e.g. from other stages or from a stage that also writes to the shared port. The other port or ports may be shared as well.

Although the invention has been described for an embodiment wherein the validation signals that enable writing to register file 17 depend on the instructions, it should be understood that the validation signal may also depend on factors, such as the value of guard bits that accompany the instructions (dependent for example on the content of guard registers specified in the instructions).

Although two immediately adjacent pipeline stages 10c,d with the capability of writing have been shown by way of example, it will be appreciated that the invention is not limited to this example. For example, a greater number of successive pipeline stages may have the ability to write a result, or results to register file 17. In this case, a sequencing circuit is preferably included so that each stage in turn gets an opportunity to write in a predetermined sequence, preferably starting from the stage that is most downstream, before the stages get another opportunity. In another example, the stages that have the ability to write need not be immediately adjacent.

The invention claimed is:

1. A data processing circuit with a pipelined asynchronous instruction processor, the data processing circuit comprising
   a register file with a write port;
   a pipeline of instruction processing stages a first and a second one of the stages that are in series in the pipeline each having a result output for writing a result to the write port, if instruction dependent information in the stage concerned requires writing;
   a timing circuit arranged to time transfer of instruction dependent information between the stages at mutually different time points, so that processing of successive instructions in respective stages partially overlaps;
   a write sequencing circuit arranged to perform write tests alternately for instruction dependent information in the first and second one of the stages the write sequencing circuit when performing the write test for a particular one of the stages testing whether the instruction dependent information in the particular one of the stages requires writing of a result, and, if so, delaying transfer of new instruction dependent information through the pipeline to the particular one of the stages until the write port has been committed to writing the result before results that the write port may subsequently be committed to write.

2. A data processing circuit according to claim 1, wherein the write sequencing circuit is arranged to trigger the write test in each particular one of the stages in response to a request signal for transferring instruction dependent information from that particular one of the stages and to delay a request signal for transferring the new instruction dependent information to the particular one of the stage until both writing of the result has been initiated and instruction dependent information has been transferred from the particular one of the stages.

3. A data processing circuit according to claim 2, wherein the timing circuit is arranged to start repeated cycles of successive transfers of instruction dependent information, wherein the transfers in each cycle are timed successively later for a series of the stages that are successively more upstream along the pipeline, the timing circuit starting each cycle at a downstream end of the series, in response to a transfer from a previous cycle at an upstream end of the series.

4. A data processing circuit according to claim 3, wherein the timing circuit comprises
   a chain of timing signal transfer circuits for propagating timing signals through the chain, timing signal transfer circuits in the chain that receive a propagating timing signal successively later having outputs to control transfer of instruction dependent information coupled to successively more upstream stages in the series respectively;
   conditional delay elements functionally located in the chain, to propagate the timing signals to the timing signal transfer circuits that have outputs to control transfer of instruction dependent information to the first and second one of the stages respectively, the conditional delay elements comprising
   a first and a second timing signal path the conditional delay elements routing the timing signals through the first path or the second path dependent on whether instruction dependent information in the corresponding stage requires writing of a result or not respectively, the first path comprising an enable circuit arranged to enable propagation of the timing signal dependent on whether the write port is able to commit to writing of a result.

5. A data processing circuit according to claim 1, wherein the first one of the stages is arranged to output a plurality of results, at least in response to a first type of instruction, each write test comprising testing whether the instruction dependent information in the particular one of the stages requires writing of a plurality of results, and, if so, delaying transfer of new instruction dependent information through the pipeline to the particular one of the stages until the write port has been committed to writing all of the plurality of the results before subsequent results.

6. A data processing circuit according to claim 1, wherein the first one of the stages is an execution stage, arranged to perform instruction selected arithmetic operations using operands specified by the instructions, and the second one of the stages is a memory stage, arranged to access a memory using addresses specified by the instruction, the first and second one of the stages being arranged to write results to the register file when executing to arithmetic and memory access instructions respectively.

7. A data processing circuit according to claim 1, wherein the execution stage is arranged to update a memory address specified by memory access instructions of a first type, when executing memory access instructions of the first type, and to write an updated address that results from said updating to the write port of the register file as a result.

8. A data processing circuit according to claim 1, wherein the instruction set that the data processing circuit is arranged to execute includes instructions of a first and second type, the first and second one of the execution stages being arranged to write a result in response to instructions of the first and second type respectively.

9. A data processing circuit according to claim 8, wherein the instructions of the first type include a first and second subset, each instruction of the first subset being of both the first and second type, instructions from the second subset not causing the second one of the stages being arranged to write a result.

10. A data processing circuit according to claim 1, wherein the write sequencing circuit is arranged to perform the write test by testing the instruction dependent information in the particular one of the stages to determine whether writing of the result is required.

11. A method of executing a program of instructions, using a pipelined asynchronous instruction processor with a pipelined asynchronous instruction processor, with a register file with a write port and a pipeline of instruction processing stages wherein a first and a second one of the stages each have a result output for writing a result to the write port, if instruction dependent information in the stage concerned requires writing, the method comprising:
   executing instructions in pipelined fashion, timing of transfer of instruction dependent information through the pipeline differing for different stages so that processing of successive instructions in respective stages partially overlaps;

performing write tests alternately for instruction dependent information in the first and second one of the stages performing the write test comprising testing whether the instruction dependent information in the particular one of the stages requires writing of a result, and, if so, delaying transfer of new instruction dependent information through the pipeline to the particular one of the stages until the write port has been committed to writing the result before results that the write port may subsequently be committed to write.

* * * * *